(12) United States Patent
Sha et al.

(10) Patent No.: US 12,211,395 B2
(45) Date of Patent: Jan. 28, 2025

(54) MACHINE LEARNING-BASED EDUCATIONAL CONTENT ADAPTATION BASED ON USER PERSONAL CHARACTERISTICS

(71) Applicant: Dell Products L.P., Round Rock, TX (US)

(72) Inventors: Danqing Sha, Shanghai (CN); Amy Seibel, Newton, MA (US); Eric Bruno, Shirley, NY (US); Zhen Jia, Pudong (CN)

(73) Assignee: Dell Products L.P., Round Rock, TX (US)

( * ) Notice: Subject to any disclaimer, the term of this patent is extended or adjusted under 35 U.S.C. 154(b) by 508 days.

(21) Appl. No.: 17/566,186

(22) Filed: Dec. 30, 2021

(65) Prior Publication Data

US 2023/0215283 A1 Jul. 6, 2023

(51) Int. Cl.
*G09B 5/12* (2006.01)
*G06F 18/214* (2023.01)
*G06N 20/00* (2019.01)

(52) U.S. Cl.
CPC ............ *G09B 5/12* (2013.01); *G06F 18/214* (2023.01); *G06N 20/00* (2019.01)

(58) Field of Classification Search
CPC .......... G09B 5/12; G06N 20/00; G06F 18/214
See application file for complete search history.

(56) References Cited

U.S. PATENT DOCUMENTS

| | | | |
|---|---|---|---|
| 2005/0026131 A1* | 2/2005 | Elzinga .................... | G09B 5/00 434/365 |
| 2008/0038708 A1* | 2/2008 | Slivka ...................... | G09B 7/08 434/350 |
| 2017/0169715 A1* | 6/2017 | Alyuz Civitci ........ | G06N 20/20 |
| 2018/0293515 A1* | 10/2018 | Prokopenya ............. | G09B 5/02 |

(Continued)

OTHER PUBLICATIONS

Lancheros et al., "Content adaptation for Students with Learning Difficulties: Design and Case Study", https://www.researchgate.net/publication/265857347_Content_adaptation_for_students_with_learning_difficulties_Design_and_case_study, downloaded on Dec. 28, 2021.

(Continued)

*Primary Examiner* — Omkar A Deodhar
*Assistant Examiner* — Shauna-Kay Hall
(74) *Attorney, Agent, or Firm* — Ryan, Mason & Lewis, LLP (57) ABSTRACT

Techniques are provided for machine learning-based educational content adaptation based on user personal characteristics. One method comprises obtaining personal characteristics of at least one user; applying the personal characteristics of the at least one user to at least one machine learning model to automatically adapt at least one educational content item for the at least one user using one or more of the applied personal characteristics of the at least one user; and initiating a provision of the at least one automatically adapted educational content item to the at least one user. Technology-related characteristics of the at least one user may also be applied to the at least one machine learning model to further adapt the at least one educational content item for the at least one user using the applied technology-related characteristics.

20 Claims, 7 Drawing Sheets

(56) References Cited

U.S. PATENT DOCUMENTS

2021/0073664 A1* 3/2021 Pandit .................... G06N 20/00
2022/0100867 A1* 3/2022 Sinn ...................... G06N 3/082

OTHER PUBLICATIONS

Premlatha et al., "Learning Content design and learner adaptation for adaptive e-learning environment: a survey", https://link.springer.com/article/10.1007/s10462-015-9432-z, downloaded on Dec. 28, 2021.
"5 Types of Instructional Adaptations for your Inclusive Classroom" https://blog.brookespublishing.com/5-types-of-instructional-adaptations-for-your-inclusive-classroom/, Brookes Blog, dated Mar. 28, 2017, downloaded on Dec. 28, 2021.

* cited by examiner

FIG. 1

| EDUCATIONAL CONTENT DATABASE 200 | | | | |
|---|---|---|---|---|
| CONTENT ITEM IDENTIFIER | CONTENT ITEM LOCATION | CONTENT ITEM TAG(S) | CONTENT ITEM LABEL(S) | PROGRAMMATIC INDICATOR(S)/ TIME STAMPS |
| CONTENT A | SERVER 123 | VIDEO; SCIENCE LAB | THUMBS UP RATING | SWAPPABLE IMAGE AT 31 MINUTES |
| ... | | ... | | ... |
| CONTENT F | SERVER A1 | SLIDE DECK; HISTORY | THUMBS DOWN RATING | SWAPPABLE ICON IN SLIDE 21 |
| ... | | ... | | ... |

MACHINE LEARNING-BASED EDUCATIONAL CONTENT ADAPTATION BASED ON USER PERSONAL CHARACTERISTICS

FIELD

The field relates generally to information processing systems and more particularly, to content provision techniques in such information processing systems.

BACKGROUND

Educational content is increasingly offered remotely for both academic students and professional learners. Remote educational content may comprise, for example, slide-based online activities, content presented as part of a video conference, and online courses. There are a number of challenges, however, that need to be addressed in order for a remote learner to achieve academic success. For example, it is particularly challenging in a remote education environment to ensure consistent access to a quality education for students by effectively meeting the diverse needs of remote learners and accommodating the diverse backgrounds of remote learners.

SUMMARY

In one embodiment, a method comprises obtaining one or more personal characteristics of at least one user; applying the one or more personal characteristics of the at least one user to at least one machine learning model to automatically adapt at least one educational content item for the at least one user using one or more of the applied personal characteristics of the at least one user; and initiating a provision of the at least one automatically adapted educational content item to the at least one user.

The automatically adapting the at least one educational content item for the at least one user may comprise: (i) adjusting a language of the at least one educational content item based at least in part on a language of the at least one user, (ii) adjusting at least one feature in the at least one educational content item, using one or more programmatic indicators in the at least one educational content item, based at least in part on a corresponding personal characteristic of the at least one user identified in one or more of the applied personal characteristics of the at least one user, and/or (iii) selecting at least one educational content item from a plurality of educational content items, wherein the selected at least one educational content item comprises at least one feature that corresponds to at least one personal characteristic of the at least one user identified in the one or more personal characteristics of the at least one user.

In some embodiments, one or more technology-related characteristics of the at least one user can be applied to the at least one machine learning model to automatically adapt the at least one educational content item for the at least one user based at least in part on one or more of the applied technology-related characteristics of the at least one user. The automatically adapting the at least one educational content item for the at least one user using the one or more applied technology-related characteristics may comprise: (i) applying at least one compression technique to the at least one educational content item, (ii) adjusting one or more presentation parameters of the at least one educational content item, and/or (iii) processing at least a portion of the at least one educational content item using one or more of at least one edge computing device and at least one cloud computing device to reduce a computational load on at least one device of the at least one user.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for machine learning-based educational content adaptation based on user personal characteristics.

One or more aspects of the disclosure recognize that student populations are increasingly diverse in terms of culture, location, economic background and/or learning styles. Many existing educational approaches employ a "one size fits all" style (e.g., all students take the same educational courses and educational assessments (e.g., examinations)). There is currently little, if any, customization of content for students with different backgrounds, demography, learning style and/or culture, resulting in a lack of inclusiveness for many students.

An inclusive educational experience, in at least some embodiments, allows students from different backgrounds and with different abilities to learn together in an inclusive environment. Academic inclusion, for example, provides educational content that is adapted and differentiated to accommodate specific needs and abilities of pupils (e.g., pupils with special educational needs) and that is appropriate to age, ability, backgrounds and required outcomes. Physical inclusion provides: (i) access to facilities and/or infrastructure (e.g., using assistive technologies for people with disabilities); and/or (ii) access to technology (e.g., hardware and software), while addressing variations of user devices, networks, and/or privacy and parental control settings.

In one or more embodiments, educational content adaptation techniques are provided that dynamically adapt educational content and/or educational assessments (e.g., test materials and/or test answer choices) using one or more machine learning models based on demographic data, educational background, culture, and/or other personal characteristics of one or more users. In at least some embodiments, the educational content is adapted while still meeting curriculum requirements. Inclusion-based modifications made to the educational content in accordance with one or more embodiments of the disclosure will generally relate to a content delivery style and/or a selection of available content elements and will not materially impact the substance of the content that the student would otherwise have been offered in order to ensure that the curriculum requirements are satisfied. For example, images in an academic test can be selected on the basis of image characteristics that are similar to characteristics of a particular user, to provide a sense of inclusiveness or relatability, without changing a level of rigor of the academic test.

In some embodiments, the machine learning-based educational content adaptation techniques improve the inclusiveness of the adapted educational content for one or more students.

In one or more embodiments, the disclosed educational content adaptation techniques dynamically adapt educational content based on technology-related characteristics of a user, such as an available bandwidth and/or device capabilities (e.g., processing power or display size). For example, an educational content item may be compressed before being transmitted to a remote user that has poor bandwidth, or at least some of the processing of an educational content item may be transferred to an edge computing device and/or a cloud computing device to reduce a computational load on a device of at least one remote user.

The disclosed machine learning-based educational content adaptation techniques provide a technical solution that enables the adaptation of educational materials in a manner that is more granular and more frequent than can be performed by a human. In addition, the automated educational content adaptation techniques, in accordance with one or more embodiments, scale to a larger number of students across a wide variety of learning materials, relative to a human-driven approach. In at least some embodiments, various forms of feedback, discussed further below, are employed to retrain and improve one or more of the machine learning adaptation models over time.

In one or more embodiments, the disclosed machine learning-based adaptation system provides a technical solution that improves inclusion in education, where educational content and/or educational assessments are dynamically adapted based at least in part on a background or other personal characteristics of a user. In this manner, the educational content can be tailored to the diverse needs, culture, abilities, infrastructure and/or other characteristics of each student and can be employed to reduce one or more forms of discrimination in a learning environment.

In addition, the technical solutions provided by the disclosed educational content adaptation system, in at least some embodiments, can create an inclusive environment for education, and can improve learning outcomes and opportunities for a diverse group of students, while fostering a sense of belonging for students. For example, the educational content adaptation enabled by the disclosed techniques can help students with a disability, such as a hearing or a visual challenge, to feel included by providing examples of such a disability (or similar disabilities) in the presented educational materials. In one particular example, a student with a physical disability may be presented with educational content that has been adapted to include individuals in a wheelchair. Further, by sharing this type of content with other students, regardless of whether they have a similar disability, more students can be exposed to a more diverse group of people.

In this manner, one or more embodiments of the disclosure provide technical solutions that take disabilities and/or other user differences into account in adapting educational content, and enable a particular student or another trusted user to review and provide feedback on the educational content adaptation for the particular user (and to modify the educational content adaptation, if necessary). For example, some students may opt to self-identify with a certain disability, or to select educational content adaptation features that they would not be comfortable with, and the educational content adaptation would take this information into account when deciding which types of educational content adaptation are appropriate for a certain student.

Figure 1:
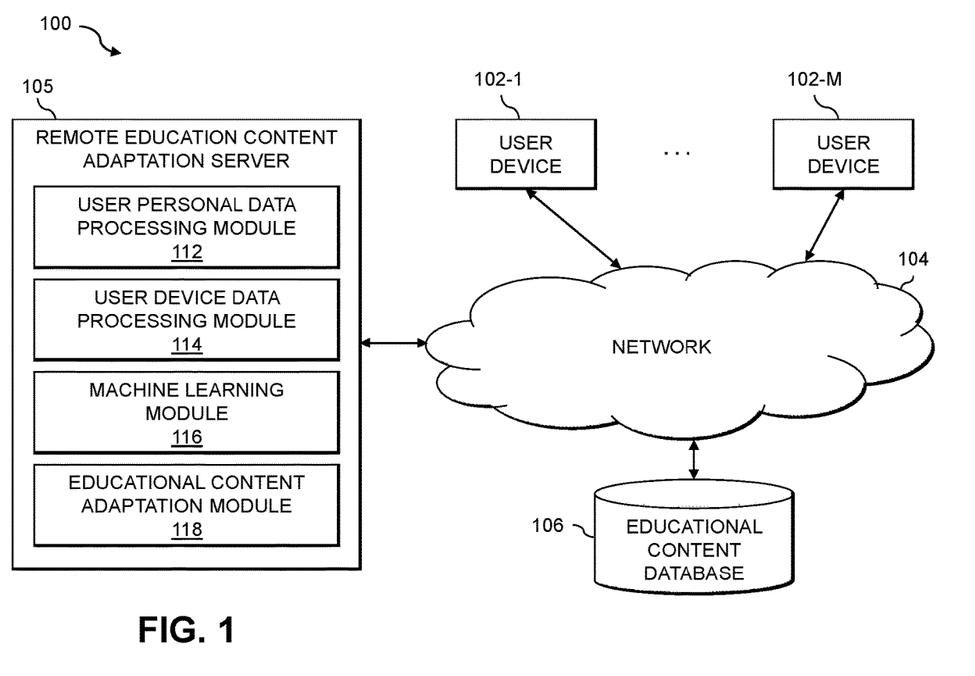
FIG. 1 illustrates an information processing system configured for machine learning-based educational content adaptation based on user personal characteristics in accordance with an illustrative embodiment.

FIG. 1 shows an information processing system 100 configured in accordance with an illustrative embodiment. The information processing system 100 comprises a plurality of user devices 102-1 through 102-M, collectively referred to herein as user devices 102. The information processing system 100 further comprises one or more remote education content adaptation servers 105 and an educational content database 106, discussed below.

The user devices 102 may comprise, for example, host devices and/or devices such as mobile telephones, laptop computers, tablet computers, desktop computers or other types of computing devices (e.g., virtual reality (VR) devices or augmented reality (AR) devices). In some embodiments, the user devices 102 may comprise devices referred to herein as "end devices." Such end devices or other types of user devices 102 are examples of what are more generally referred to herein as "processing devices." Some of these processing devices are also generally referred to herein as "computers." The user devices 102 may comprise a network client that includes networking capabilities such as ethernet, Wi-Fi, etc. The user devices 102 may be operated, for example, by students and/or educators.

One or more of the user devices 102 and the remote education content adaptation server 105 may be coupled to a network 104, where the network 104 in this embodiment is assumed to represent a sub-network or other related portion of a larger computer network. The network 104 is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network 104 in some embodiments therefore comprises combinations of multiple different types of networks, each comprising processing devices configured to communicate using internet protocol (IP) or other related communication protocols.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the user devices 102 and the remote education content adaptation server 105 illustratively comprise processing devices of one or more processing platforms. For example, the remote education content adaptation server 105 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the user devices 102 and the remote education content adaptation server 105 can additionally or alternatively be part of edge infrastructure and/or cloud infrastructure such as an Amazon Web Services (AWS) system. Other examples of cloud-based systems that can be used to provide at least portions of the user devices 102 and/or the remote education content adaptation server 105 include Google Cloud Platform (GCP) and Microsoft Azure.

As shown in FIG. 1, the exemplary remote education content adaptation server 105 comprises a user personal data processing module 112, a user device data processing module 114, a machine learning module 116 and an educational content adaptation module 118, as discussed further below. In one or more embodiments, the user personal data processing module 112 may be used to process user personal data (e.g., demographic information, language preferences, socioeconomic status, cultural and/or ethnic information, gender, disabilities, academic history, academic grade level, learning style, past learning records, academic skills, and/or test results) for each user and to optionally perform pre-processing tasks on the user personal data, to prepare the sensor data for further processing by one or more machine learning models. The user device data processing module 114 may be used to process user device data (e.g., available bandwidth and/or device capabilities, such as processing power or display size) and to optionally perform pre-processing tasks on the user personal data, to prepare the sensor data for further processing by one or more machine learning models.

In the example of FIG. 1, the exemplary machine learning module 116 employs one or more machine learning models to evaluate the user personal data and/or user device data and to recommend one or more educational content adaptations or other actions. The educational content adaptation module 118 implements one or more educational content adaptations recommended by the machine learning module 116.

It is to be appreciated that this particular arrangement of modules 112, 114, 116, 118 illustrated in the remote education content adaptation server 105 of the FIG. 1 embodiment is presented by way of example only, and alternative arrangements can be used in other embodiments. For example, the functionality associated with modules 112, 114, 116, 118 in other embodiments can be combined into a single module, or separated across a larger number of modules. As another example, multiple distinct processors and/or memory elements can be used to implement different ones of modules 112, 114, 116, 118 or portions thereof. At least portions of modules 112, 114, 116, 118 may be implemented at least in part in the form of software that is stored in memory and executed by a processor.

The remote education content adaptation server 105 may further include one or more additional modules and other components typically found in conventional implementations of such devices, although such additional modules and other components are omitted from the figure for clarity and simplicity of illustration.

In the FIG. 1 embodiment, the remote education content adaptation server 105 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of the remote education content adaptation server 105 to reside in different data centers. Numerous other distributed implementations of the components of the system 100 are possible.

As noted above, the remote education content adaptation server 105 can have an associated educational content database 106 configured to store information related to one or more of the users, user devices 102, and/or educational content items, as discussed further below in conjunction with FIG. 2. Although the educational content information is stored in the example of FIG. 1 in a single educational content database 106, in other embodiments, an additional or alternative instance of the educational content database 106, or portions thereof, may be incorporated into the remote education content adaptation server 105 or other portions of the system 100.

The educational content database 106 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 and the remote education content adaptation server 105 can be one or more input/output devices (not shown), which illustratively comprise keyboards, displays or other types of input/output devices in any combination. Such input/output devices can be used, for example, to support one or more user interfaces to a user device 102, as well as to support communication between the remote education content adaptation server 105 and/or other related systems and devices not explicitly shown.

The memory of one or more processing platforms illustratively comprises random access memory (RAM), readonly memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for machine learning-based educational content adaptation based on user personal characteristics is presented by way of illustrative example only, and in other embodiments additional or alternative elements may be used. Thus, another embodiment includes additional or alternative systems, devices and other network entities, as well as different arrangements of modules and other components.

Figure 2:
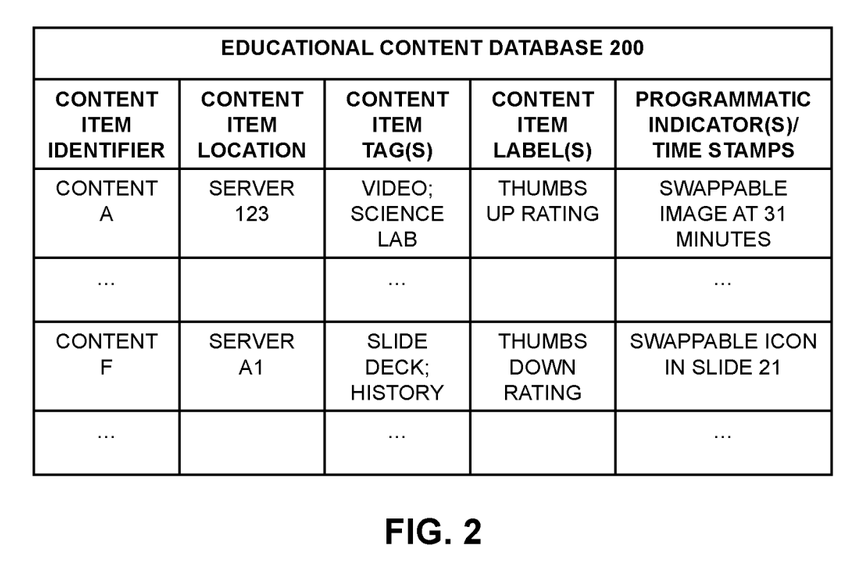
FIG. 2 is a sample table illustrating an educational content database for machine learning-based educational content adaptation in accordance with an illustrative embodiment.

FIG. 2 is a sample table illustrating an educational content database 200 for machine learning-based educational content adaptation in accordance with an illustrative embodiment. In the example of FIG. 2, each educational content item in the educational content database 200 is identified by a content item identifier and indicates, for each listed educational content item, a location of the respective content item, any tags associated with the respective content item, any labels associated with the respective content item (e.g., used for training one or more machine learning models), and/or any programmatic indicators or related time stamps associated with the respective content item.

In the example of FIG. 2, the programmatic indicators identify portions of the respective content item that may be swapped with an alternative element that is more relatable to a particular user, optionally with a time stamp or another indication of the location of the portion within a given content item that may be swapped with an alternative element. For example, a video may comprise certain frames where the gender or cultural background, for example, of one or more people in the images may be selected to match the gender or cultural background, respectively, of the particular student that will watch the video. In other embodiments, the features of each content item that can be changed may come from a list of protected classes, from scanning the data in a federated or other learning model, from learning the demographics of a diverse population (e.g., in a "ground truth" data set), or from other means. In one or more embodiments, maximum and/or minimum requirements can be employed, or recommended ranges, to ensure that the content presented to a student is representative of a diverse group of people and also helps the particular student to feel included.

In some embodiments, the educational content database 200 of FIG. 2 comprises an expanding database of related educational material, that may be specific to the students, their learning history, and their related results, and may be intelligently and autonomously indexed by keywords used in the teacher's learning plans. In this manner, the educational content database 200 enables the disclosed machine learning-based educational content adaptation system to swap images, text and illustrations, for example, with those that are more suitable to the background and learning outcomes of a particular student. The educational content database 200 can identify portions of the educational content that can be swapped or otherwise transformed with an alternate item that is more appropriate for the particular characteristics of a given user.

Figure 3:
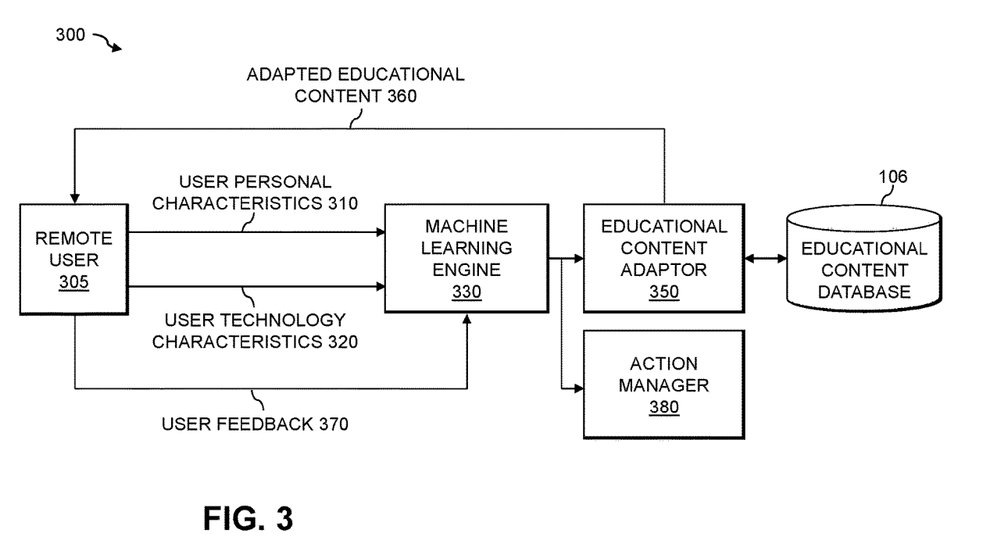
FIG. 3 illustrates an exemplary system architecture for machine learning-based educational content adaptation based on user personal characteristics in accordance with an illustrative embodiment.

FIG. 3 illustrates an exemplary system architecture 300 for machine learning-based educational content adaptation based on user personal characteristics in accordance with an illustrative embodiment. In the example of FIG. 3, user personal characteristics 310 and/or user technology characteristics 320 associated with a remote user 305 are applied to a machine learning engine 330. A training process for one or more models associated with the machine learning engine 330 is discussed further below in conjunction with FIG. 4.

In one or more embodiments, the machine learning engine 330 processes the user personal characteristics 310 (e.g., a learning history, background, and/or academic preference of the remote user 305) and/or user technology characteristics 320 (e.g., device and/or network bandwidth parameters associated with the user device 102 of the remote user 305), as well as any educational standards or other curriculum requirements that the adapted content must satisfy or support. The machine learning engine 330 generates one or more educational content adaptation recommendations to an educational content adaptor 350 and/or an action manager 380.

In the example of FIG. 3, the educational content adaptor 350 processes the output from the machine learning engine 330 and generates adapted educational content 360. For example, the educational content adaptor 350 may access one or more content items in the educational content database 106 and transform the accessed one or more content items according to the educational content adaptation recommendations from the machine learning engine 330. As noted above, in some embodiments, the educational content adaptation recommendations may comprise tailoring certain aspects of the adjusted educational content to personal characteristics (e.g., cultural aspects) and/or device capabilities of the remote user 305. The language of the educational content can be automatically adjusted to fit the native or preferred language of the remote user, for example, using real-time translation, captioning and/or text-to-speech/speech-to-text to reduce a language barrier.

In this manner, the adapted educational content 360 fosters a sense of inclusion in the educational content. The adapted educational content 360 satisfies the same learning goals, while also providing students with examples and other things that they can relate to in the adapted educational content 360. In some implementations, students of a given ethnicity and/or cultural background will see examples of people with the same or similar ethnicity and/or cultural background in the adapted educational content 360. Similarly, students of a given disability will experience examples of people with the same or similar disability in the adapted educational content 360.

In addition, the adapted educational content 360 may also foster a sense of inclusion in educational assessments. In a similar manner as the educational content itself, the assessments may have a delivery mechanism dynamically adapted based on the demographic data, background culture, or other personal characteristics of the remote user 305. The intention is not to change the level of rigor that the student would otherwise have seen, but rather to make adaptations such as the adaptations described above to make the student feel more included during the testing phase.

In some embodiments, the adapted educational content 360 may be adapted to the available bandwidth to address one or more connectivity issues. For example, if the bandwidth or network speed is reported to be low for a student, then a low-resolution video (or content with video replaced by pictures and/or text, for example) may be delivered to the student until the network bandwidth improves. To ensure that the learning is not impacted, there are several options such as requiring a minimum standard for resolution. If the standard cannot be met, however, the content delivery method can be changed or the order in which a student receives content could be changed slightly if it makes sense pedagogically.

In other embodiments, the adapted educational content 360 may be adapted to one or more device parameters of a user device 102 the remote user 305. For example, real-time compression may be employed to resize the educational content to fit with the display characteristics of the user device 102 (shown in FIG. 1) of the remote user 305. The adapted educational content 360 may also be dynamically updated in real-time based on the user technology characteristics 320 from the remote user 305 to ensure an adequate content delivery quality. For example, a video can be downgraded from a 4K format to a high-definition format to a standard definition format, as needed.

In addition, the educational content adaptation recommendations may comprise transferring a portion of the processing of the adjusted educational content 360 to one or more edge or cloud devices to reduce computational requirements for user devices 102. In this manner, students that do not have advanced user devices 102 or higher bandwidth can enjoy a similar educational content delivery quality as those students having more updated and/or expensive devices. A portion of the processing of the adjusted educational content 360 may be transferred to such edge or cloud devices, for example, in response to: a user device 102 not meeting predefined thresholds in terms of student device capabilities (e.g., by detecting that a user device 102 has changed to a device with different capabilities); a user device 102 not meeting predefined thresholds in terms of connection bandwidth; a dynamic calculation based at least in part on software agents installed with remote learning tools to dynamically measure and consider the amount of processing that should be transferred to another device (e.g., an automated sliding scale that is continuously adjusted as to how much processing will take place locally on the user device 102 and at a remote device). The transferred processing may comprise, for example, compression of content using an edge device to overcome bandwidth constraints and/or compression/decompression of content using an edge device to overcome device processing constraints (assuming bandwidth is adequate, and depending on whether the data is traveling to or from the user device 102).

In this manner, the transfer of processing to one more edge devices, cloud devices or other nearby devices reduces the computational load for user devices 102 and enables less expensive and/or less capable end clients for remote education. Among other benefits, the transferred processing and corresponding lower requirements for user devices 102 can increase the sense of inclusion for users of such less expensive and/or less capable user devices 102, enabling students to equally access the same high-quality educational content. Further, the transferred processing may also improve privacy and/or security for students, in one or more embodiments.

In at least some embodiments, the action manager 380 processes the output from the machine learning engine 330 and generates assessments, reports and/or other recommendations, as discussed further below in conjunction with FIG. 4. The action manager 380 may also comprise a learning management system, for example, to process the user feedback 370 and update one or more machine learning models employed by the machine learning engine 330.

The user feedback 370 may comprise user ratings of the adapted educational content 360 generated by the educational content adaptor 350. The user feedback 370 may be processed to update one or more of the models associated with the machine learning engine 330, as discussed further below in conjunction with FIG. 4. The user feedback 370 can be explicit, e.g., based on survey responses, user satisfaction ratings, decisions to stay with a certain content/content delivery type (as opposed to making a change), or implied based on student engagement or learning outcomes. For example, the user feedback 370 can indicate how a given student responded to the adapted educational content 360 (e.g., related to a feeling of inclusion of the remote user 305 with respect to the adapted educational content 360). In some embodiments, the system can evaluate (e.g., during a test phase) which types of content help each remote user 305 perform best. The students can also provide input on what content makes them feel most welcome, included and/or engaged with the educational content and what content works best for them (e.g., by selecting a characteristic that they would like to see more or less of or by switching between audio and visual formats). In this manner, the machine learning-based educational content adaptation system can adapt the educational content based on a combination of stated preferences and actual results/learning outcomes.

Figure 4:
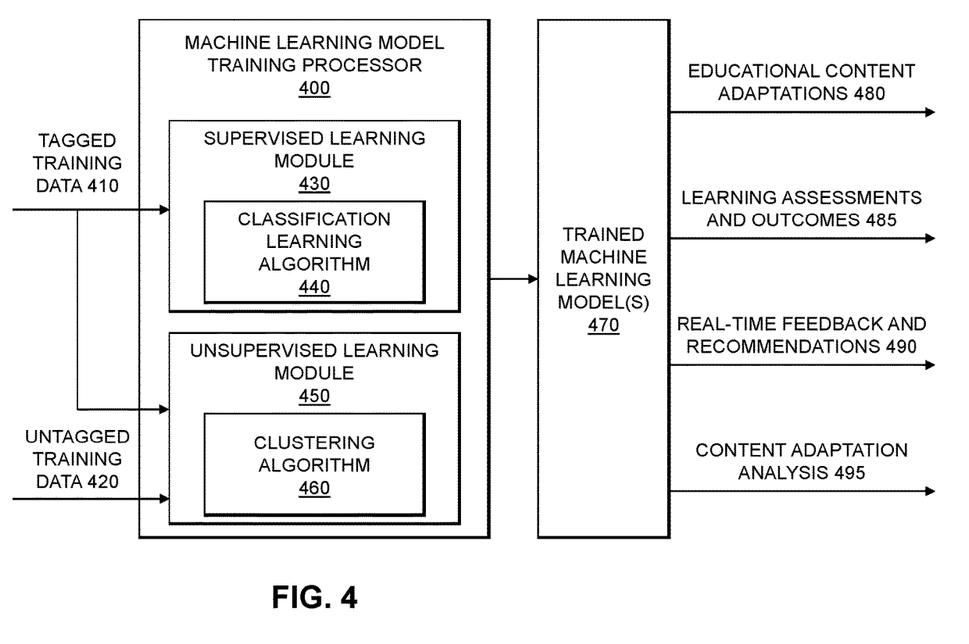
FIG. 4 illustrates a machine learning model training processor that generates one or more trained machine learning models for educational content adaptation, in accordance with an illustrative embodiment.

FIG. 4 illustrates a machine learning model training processor 400 that generates one or more trained machine learning models 470 for educational content adaptation, in accordance with an illustrative embodiment. In the example of FIG. 4, the machine learning model training processor 400 uses a hybrid supervised and unsupervised learning model and comprises a supervised learning module 430 and an unsupervised learning module 450.

The exemplary supervised learning module 430 implements a classification learning algorithm 440 that processes tagged training data 410 (e.g., previously presented educational content with tags identifying various properties of the educational content and/or classification labels indicating whether the presented educational content worked well for students with particular personal characteristics). For example, the tagged training data 410 may comprise sample images with people of different ethnicities, abilities, and status, and different presentation formats (e.g., audio and/or video).

The classification learning algorithm 440 may be implemented, for example, as a random forest classifier. Random forest decision trees can be used to detect new patterns in learning effectiveness based on a changing set of data. Federated learning techniques may be employed, for example, to improve the one or more machine learning models while protecting student privacy. Among other benefits, the supervised learning model helps to carry forth decisions from previous scenarios for new students. In addition, the disclosed machine learning-based educational content adaptation improves overall system-wide diversity and inclusion (for example, students can be exposed to a certain level of diversity, in addition to making sure that there is relatable content).

The exemplary unsupervised learning module 450 comprises a clustering algorithm 460 that processes the tagged training data 410 and untagged training data 420. The untagged training data 420 (or inconsistently tagged input data), such as new learning content, student background and/or learning history, can be grouped with other input data, such as the tagged training data 410. The clustering algorithm 460 can be implemented, for example, as a k-means clustering tool which divides the tagged training data 410 and the untagged training data 420 along common boundaries and generates clusters of similar data in order to identify the best results. The clustering algorithm 460 finds correlation between the tagged training data 410 and the untagged training data 420 and enables the untagged training data 420 to leverage the tags in the labeled data, since they are grouped together in clusters.

The machine learning model training processor 400 trains one or more machine learning models to generate at least one trained machine learning model 470. Generally, training the one or more machine learning models on a wide range of student data, from a diverse population across geography, for example, reduces bias (implicit or otherwise) in the process of adapting content for each student's educational and inclusion-related needs.

In at least one embodiment, the trained machine learning model 470 learns to output one or more educational content adaptations 480; learning assessments and outcomes 485; real-time feedback and recommendations 490; and/or content adaptation analysis 495.

The educational content adaptations 480 may comprise different versions of similar educational content after considering different possibilities of, for example, demographic data, background and/or culture. In the educational content database 106, there are also multiple ways of representing content to students, such as modeling, images, objectives and manipulatives, graphic organizers, oral and written responses, and technology.

For each remote user 305, the trained machine learning model 470 will generate personalized educational content and corresponding teaching styles from the educational content database 106 with educational offerings adapted in real time to the user characteristics and technology characteristics (e.g., bandwidth/device capabilities). It will be appreciated that this content will typically be based on high-quality content provided by educational professionals. The modifications in accordance with this disclosure are typically minor in terms of substance (e.g., changing the look of a character in an eBook or showing audio content instead of the same content in written form) with the goal of furthering inclusion while maintaining the quality and/or rigor of the educational materials. While certain students may need to be shown more, or less, advanced content based on their performance and unique areas for improvement, the received content should be in accordance with a curriculum that helps students work towards specific learning outcomes (e.g., students should not be shown more or less advanced work because they are a member of a particular demographic group). To ensure that all students are exposed to a certain baseline of content level/quality, an educator can set the standard, including requirements for what material must be covered for each student. Students can also rate their experience with each piece of educational content, as noted above.

In some embodiments, the learning assessments and outcomes 485 are generated using a database that takes into consideration the background, culture and/or demographic data of each student and will generate inclusive assessments for each student. Again, the system will take learning outcomes into account as the trained machine learning model 470 improves over time (e.g., while maintaining the quality and/or rigor of the educational materials).

The real-time feedback and recommendations 490 may comprise recommendations to students about selections of user devices 102, a recommended learning sequence of educational content, different levels of learning (e.g., difficulty level) and learning styles. The content adaptation analysis 495 may indicate if a particular demographic group or learning style is found to be underrepresented in the educational content. The trained machine learning model 470 can suggest relevant content delivery adaptations based on the original content (such as altering the appearance of some content to make it more diverse and/or inclusive, and/or by ensuring that a student sees at least some representations that mirror their own demographics and other personal characteristics). In further embodiments, the trained machine learning model 470 can suggest one or more content adaptations to be added to one or more content items in the educational content database 106.

In one or more embodiments, the trained machine learning model 470 can provide an explanation of the educational content adaptation recommendations. For example, the trained machine learning model 470 can document and report on the content shared with the student and how the content met the educational criteria, the types of changes that were made to their curriculum (e.g., changing from an audio format to a visual format, or changing the look of a character), and a comparison to other students in the class as far as inputs, learning outcomes, and student ratings (e.g., an inclusiveness of the content). The trained machine learning model 470 can also provide a fairness measure (e.g., an explanation of how all of the required content quality metrics were met for each student), and a flag indicating whether a student felt less included by certain aspects of the curriculum, especially if learning outcomes were impacted. The trained machine learning model 470 may also provide one or more recommendations indicating how a particular student can learn best going forward.

The educational content recommendations provided by the trained machine learning model 470 may also be analyzed and aggregated to provide educators with a report on an individual and/or group level indicating how students are learning with particular items and/or types of academic content. The trained machine learning model 470 may identify learning styles and recommend different levels of learning for each student, such as an active versus reflective learning style, a sensing versus intuitive learning style, a visual versus verbal learning style, and a sequential versus global learning style.

Figure 5:
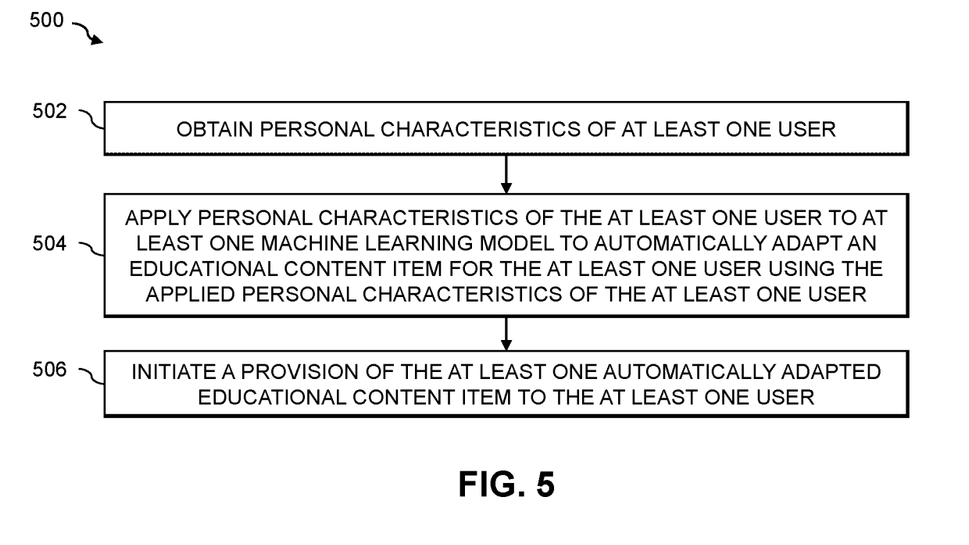
FIG. 5 is a flow diagram illustrating an exemplary implementation of a machine learning-based process for educational content adaptation in accordance with an illustrative embodiment.

FIG. 5 is a flow diagram illustrating an exemplary implementation of a machine learning-based process 500 for educational content adaptation in accordance with an illustrative embodiment. In the example of FIG. 5, the machine learning-based process 500 initially obtains one or more personal characteristics of at least one user in step 502.

The obtained personal characteristics of the at least one user may comprise, for example, an academic history, a cultural classification, a disability classification, a health impairment classification, an ethnicity classification, a learning style, and/or demographic data.

In step 504, the one or more personal characteristics of the at least one user are applied to at least one machine learning model to automatically adapt at least one educational content item for the at least one user using one or more of the applied personal characteristics of the at least one user. In step 506, a provision of the at least one automatically adapted educational content item to the at least one user is initiated.

In some embodiments, the automatically adapting the at least one educational content item for the at least one user comprises: (i) adjusting a language of the at least one educational content item based at least in part on a language of the at least one user, (ii) adjusting at least one feature in the at least one educational content item, using one or more programmatic indicators in the at least one educational content item, based at least in part on a corresponding personal characteristic of the at least one user identified in one or more of the applied personal characteristics of the at least one user, and/or (iii) selecting at least one educational content item from a plurality of educational content items, wherein the selected at least one educational content item comprises at least one feature that corresponds to at least one personal characteristic of the at least one user identified in the one or more personal characteristics of the at least one user.

In addition, one or more technology-related characteristics of the at least one user may also be applied to the at least one machine learning model to automatically adapt the at least one educational content item for the at least one user based at least in part on one or more of the applied technology-related characteristics of the at least one user. The automatically adapting the at least one educational content item for the at least one user using the one or more applied technology-related characteristics may comprise: (i) applying at least one compression technique to the at least one educational content item, (ii) adjusting one or more presentation parameters of the at least one educational content item, and/or (iii) processing at least a portion of the at least one educational content item using one or more of at least one edge computing device and at least one cloud computing device to reduce a computational load on at least one device of the at least one user.

The technology-related characteristics may comprise: (i) at least one device characteristic of at least one device of the at least one user and/or (ii) at least one network bandwidth characteristic of at least one network connection of the at least one user.

One or more of a plurality of the educational content items may be modified to adjust an inclusivity rating of the one or more modified educational content items based on a measured representation level of one or more demographic groups in the one or more modified educational content items.

In one or more embodiments, feedback, from one or more of the at least one user and another user, indicating a rating of the automatically adapted at least one educational content item may be employed to update the at least one machine learning model.

The particular processing operations and other network functionality described in conjunction with the flow diagram of FIG. 5 are presented by way of illustrative example only, and should not be construed as limiting the scope of the disclosure in any way. Alternative embodiments can use other types of processing operations for machine learning-based educational content adaptation. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide improved methods, apparatus and computer program products for providing machine learning-based educational content adaptation based on user personal characteristics. The foregoing applications and associated embodiments should be considered as illustrative only, and numerous other embodiments can be configured using the techniques disclosed herein, in a wide variety of different applications. The disclosed educational content adaptation system is intended to comply with privacy agreements and policies, and students may optionally opt out of sharing demographic information (although doing so may impact their ability to experience the greater inclusivity offered by this disclosure).

It should also be understood that the disclosed techniques for machine learning-based educational content adaptation, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for machine learning-based educational content adaptation may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute and/or storage services can be offered to cloud infrastructure tenants or other system users as a PaaS, IaaS, STaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based educational content adaptation engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based remote learning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
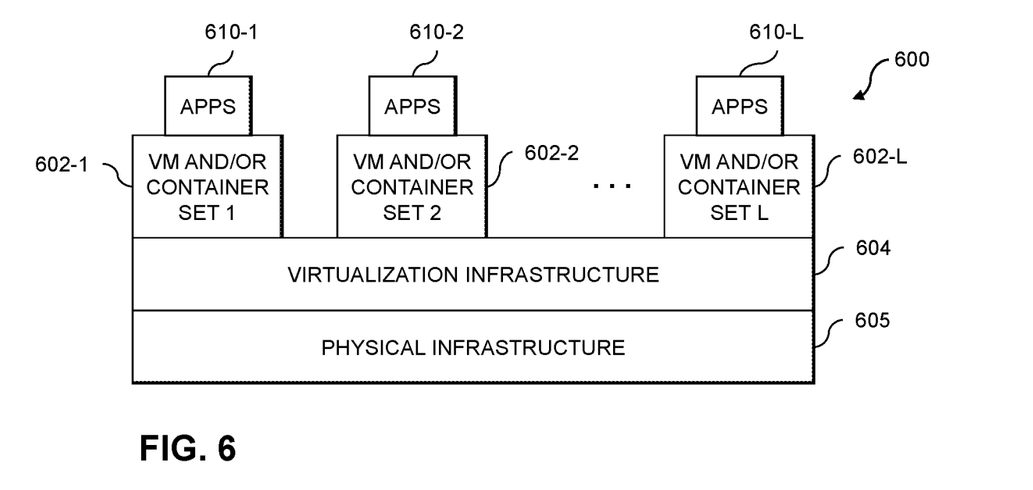
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide educational content adaptation functionality of the type described above for one or more processes running on a given one of the VMs. For example, each of the VMs can implement machine learning-based educational content adaptation control logic and associated functionality for providing an inclusive education experience for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide machine learning-based educational content adaptation functionality of the type described above for one or more processes running on different ones of the containers. For example, a container host device supporting multiple containers of one or more container sets can implement one or more instances of machine learning-based educational content adaptation control logic and associated functionality for providing an inclusive education experience.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
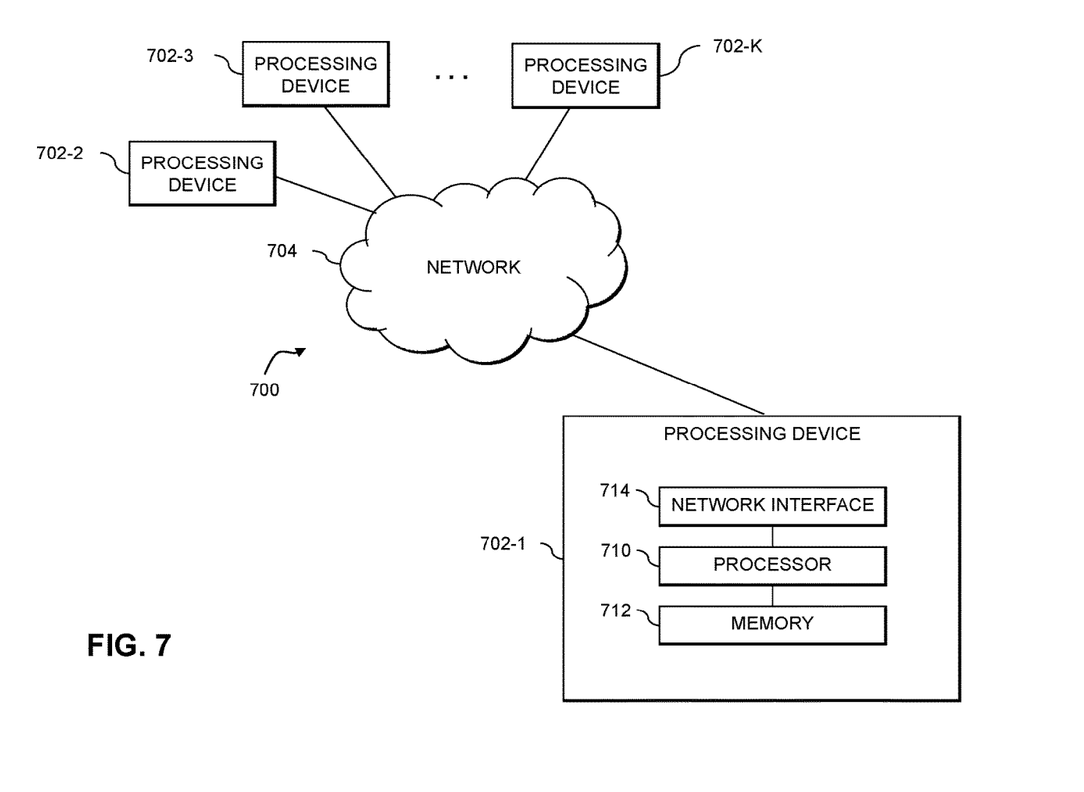
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    obtaining one or more personal characteristics of at least one user;
    applying the one or more personal characteristics of the at least one user to at least one machine learning model to automatically adapt at least one educational content item for the at least one user using one or more of the applied personal characteristics of the at least one user, wherein the at least one machine learning model comprises at least a first machine learning model and a second machine learning model, wherein the first machine learning model is trained at least in part using tagged training data and a supervised learning technique, wherein at least some of the tagged training data comprises previously presented educational content comprising one or more of: (i) at least one tag identifying a property of the previously presented educational content and (ii) at least one classification label indicating a performance of the previously presented educational content for students with one or more designated personal characteristics, and wherein the second machine learning model is trained at least in part using untagged training data and a cluster-based unsupervised learning technique; and
    initiating a provision of the at least one automatically adapted educational content item to the at least one user;
    wherein the method is performed by at least one processing device comprising a processor coupled to a memory.

2. The method of claim 1, wherein the automatically adapting the at least one educational content item for the at least one user comprises one or more of: (i) adjusting a language of the at least one educational content item based at least in part on a language of the at least one user, (ii) adjusting at least one feature in the at least one educational content item, using one or more programmatic indicators in the at least one educational content item, based at least in part on a corresponding personal characteristic of the at least one user identified in one or more of the applied personal characteristics of the at least one user, and (iii) selecting at least one educational content item from a plurality of educational content items, wherein the selected at least one educational content item comprises at least one feature that corresponds to at least one personal characteristic of the at least one user identified in the one or more personal characteristics of the at least one user.

3. The method of claim 2, wherein the adjusting the at least one feature in the at least one educational content item, using the one or more programmatic indicators in the at least one educational content item, comprises swapping a portion of the at least one educational content item with an alternative element based at least in part on the corresponding personal characteristic of the at least one user identified in the one or more of the applied personal characteristics of the at least one user.

4. The method of claim 1, wherein the one or more obtained personal characteristics of the at least one user comprise one or more of an academic history, a cultural classification, a disability classification, a health impairment classification, an ethnicity classification, a learning style, and demographic data.

5. The method of claim 1, further comprising applying one or more technology-related characteristics of the at least one user to the at least one machine learning model to automatically adapt the at least one educational content item for the at least one user based at least in part on one or more of the applied technology-related characteristics of the at least one user.

6. The method of claim 5, wherein the automatically adapting the at least one educational content item for the at least one user using the one or more applied technology-related characteristics comprises one or more of: (i) applying at least one compression technique to the at least one educational content item, (ii) adjusting one or more presentation parameters of the at least one educational content item, and (iii) processing at least a portion of the at least one educational content item using one or more of at least one edge computing device and at least one cloud computing device to reduce a computational load on at least one device of the at least one user.

7. The method of claim 5, wherein the one or more technology-related characteristics comprise one or more of: (i) at least one device characteristic of at least one device of the at least one user and (ii) at least one network bandwidth characteristic of at least one network connection of the at least one user.

8. The method of claim 1, further comprising modifying one or more of a plurality of the educational content items to adjust an inclusivity rating of the one or more modified educational content items based on a measured representation level of one or more demographic groups in the one or more modified educational content items.

9. The method of claim 1, further comprising employing feedback, from one or more of the at least one user and another user, indicating a rating of the automatically adapted at least one educational content item to update the at least one machine learning model.

10. An apparatus comprising:
at least one processing device comprising a processor coupled to a memory;
the at least one processing device being configured to implement the following steps:
obtaining one or more personal characteristics of at least one user;
applying the one or more personal characteristics of the at least one user to at least one machine learning model to automatically adapt at least one educational content item for the at least one user using one or more of the applied personal characteristics of the at least one user, wherein the at least one machine learning model comprises at least a first machine learning model and a second machine learning model, wherein the first machine learning model is trained at least in part using tagged training data and a supervised learning technique, wherein at least some of the tagged training data comprises previously presented educational content comprising one or more of: (i) at least one tag identifying a property of the previously presented educational content and (ii) at least one classification label indicating a performance of the previously presented educational content for students with one or more designated personal characteristics, and wherein the second machine learning model is trained at least in part using untagged training data and a cluster-based unsupervised learning technique; and
initiating a provision of the at least one automatically adapted educational content item to the at least one user.

11. The apparatus of claim 10, wherein the automatically adapting the at least one educational content item for the at least one user comprises one or more of: (i) adjusting a language of the at least one educational content item based at least in part on a language of the at least one user, (ii) adjusting at least one feature in the at least one educational content item, using one or more programmatic indicators in the at least one educational content item, based at least in part on a corresponding personal characteristic of the at least one user identified in one or more of the applied personal characteristics of the at least one user, and (iii) selecting at least one educational content item from a plurality of educational content items, wherein the selected at least one educational content item comprises at least one feature that corresponds to at least one personal characteristic of the at least one user identified in the one or more personal characteristics of the at least one user.

12. The apparatus of claim 10, further comprising applying one or more technology-related characteristics of the at least one user to the at least one machine learning model to automatically adapt the at least one educational content item for the at least one user based at least in part on one or more of the applied technology-related characteristics of the at least one user and wherein the automatically adapting the at least one educational content item for the at least one user using the one or more applied technology-related characteristics comprises one or more of: (i) applying at least one compression technique to the at least one educational content item, (ii) adjusting one or more presentation parameters of the at least one educational content item, and (iii) processing at least a portion of the at least one educational content item using one or more of at least one edge computing device and at least one cloud computing device to reduce a computational load on at least one device of the at least one user.

13. The apparatus of claim 10, further comprising modifying one or more of a plurality of the educational content items to adjust an inclusivity rating of the one or more modified educational content items based on a measured representation level of one or more demographic groups in the one or more modified educational content items.

14. The apparatus of claim 10, further comprising employing feedback, from one or more of the at least one user and another user, indicating a rating of the automatically adapted at least one educational content item to update the at least one machine learning model.

15. A non-transitory processor-readable storage medium having stored therein program code of one or more software programs, wherein the program code when executed by at least one processing device causes the at least one processing device to perform the following steps:
obtaining one or more personal characteristics of at least one user;
applying the one or more personal characteristics of the at least one user to at least one machine learning model to automatically adapt at least one educational content item for the at least one user using one or more of the applied personal characteristics of the at least one user, wherein the at least one machine learning model comprises at least a first machine learning model and a second machine learning model, wherein the first machine learning model is trained at least in part using tagged training data and a supervised learning technique, wherein at least some of the tagged training data comprises previously presented educational content comprising one or more of: (i) at least one tag identifying a property of the previously presented educational content and (ii) at least one classification label indicating a performance of the previously presented educational content for students with one or more designated personal characteristics, and wherein the second machine learning model is trained at least in part using untagged training data and a cluster-based unsupervised learning technique; and
initiating a provision of the at least one automatically adapted educational content item to the at least one user.

16. The non-transitory processor-readable storage medium of claim 15, wherein the automatically adapting the at least one educational content item for the at least one user comprises one or more of: (i) adjusting a language of the at least one educational content item based at least in part on a language of the at least one user, (ii) adjusting at least one feature in the at least one educational content item, using one or more programmatic indicators in the at least one educational content item, based at least in part on a corresponding personal characteristic of the at least one user identified in one or more of the applied personal characteristics of the at least one user, and (iii) selecting at least one educational content item from a plurality of educational content items, wherein the selected at least one educational content item comprises at least one feature that corresponds to at least one personal characteristic of the at least one user identified in the one or more personal characteristics of the at least one user.

17. The non-transitory processor-readable storage medium of claim 15, further comprising applying one or more technology-related characteristics of the at least one user to the at least one machine learning model to automatically adapt the at least one educational content item for the at least one user based at least in part on one or more of the applied technology-related characteristics of the at least one user.

18. The non-transitory processor-readable storage medium of claim 17, wherein the automatically adapting the at least one educational content item for the at least one user using the one or more applied technology-related characteristics comprises one or more of: (i) applying at least one compression technique to the at least one educational content item, (ii) adjusting one or more presentation parameters of the at least one educational content item, and (iii) processing at least a portion of the at least one educational content item using one or more of at least one edge computing device and at least one cloud computing device to reduce a computational load on at least one device of the at least one user.

19. The non-transitory processor-readable storage medium of claim 15, further comprising modifying one or more of a plurality of the educational content items to adjust an inclusivity rating of the one or more modified educational content items based on a measured representation level of one or more demographic groups in the one or more modified educational content items.

20. The non-transitory processor-readable storage medium of claim 15, further comprising employing feedback, from one or more of the at least one user and another user, indicating a rating of the automatically adapted at least one educational content item to update the at least one machine learning model.

* * * * *